(12) United States Patent
Lu et al.

(10) Patent No.: US 9,792,467 B2
(45) Date of Patent: Oct. 17, 2017

(54) WIRELESS CARD READER AND METHOD FOR STORING DATA

(71) Applicant: Huawei Technologies Co., Ltd., Shenzhen (CN)

(72) Inventors: Haizhao Lu, Shenzhen (CN); Qingan Rong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 294 days.

(21) Appl. No.: 14/514,103

(22) Filed: Oct. 14, 2014

(65) Prior Publication Data

US 2015/0029004 A1    Jan. 29, 2015

Related U.S. Application Data

(63) Continuation of application No. PCT/CN2013/084242, filed on Sep. 26, 2013.

(30) Foreign Application Priority Data

Mar. 26, 2013  (CN) .......................... 2013 1 0101047

(51) Int. Cl.
  *H04Q 5/00* (2006.01)
  *G06K 7/10* (2006.01)
  (Continued)

(52) U.S. Cl.
  CPC ....... *G06K 7/10009* (2013.01); *G06K 7/0013* (2013.01); *G06K 19/0723* (2013.01); *G06K 19/07741* (2013.01); *G06K 7/0008* (2013.01)

(58) Field of Classification Search
  CPC ............. G06K 7/0008; G06K 19/0723; G07C 9/00111
  (Continued)

(56) References Cited

U.S. PATENT DOCUMENTS 9,020,421 B2 * 4/2015 Toshimitsu ............. H04W 8/22
                                                340/572.2
2005/0280511 A1 * 12/2005 Yokoyama ............. G06K 19/07
                                                340/10.5
(Continued)

FOREIGN PATENT DOCUMENTS

CN    1710604 A    12/2005
CN    1941545 A    4/2007
(Continued)

OTHER PUBLICATIONS

Partial English Translation and Abstract of Chinese Patent Application No. CN201936311U, Jan. 4, 2015, 4 pages.
(Continued)

*Primary Examiner* — Carlos E Garcia
(74) *Attorney, Agent, or Firm* — Conley Rose, P.C.

(57) ABSTRACT

A wireless card including a wireless power receiving module configured to receive wireless power supply from a first wireless user equipment in a first time period, to obtain first power; a wireless communications module, electrically connected to the wireless power receiving module, and configured to use the first power in the first time period and use ultra-wideband impulse radio to perform wireless communication with the first wireless user equipment; a contact-type power supply module, electrically connected to the wireless power receiving module, and configured to use the first power in the first time period to supply power to an inserted memory card; a first contact-type communications module, electrically connected to the wireless power receiving module, in communication connection with the wireless communications module, and configured to use the first power in the first time period to perform contact-type communication with the memory card.

13 Claims, 2 Drawing Sheets

(51) Int. Cl.
*G06K 19/07* (2006.01)
*G06K 19/077* (2006.01)
*G06K 7/00* (2006.01)

(58) Field of Classification Search
USPC .................................. 340/5.6, 5.61, 5.64
See application file for complete search history.

(56) References Cited

U.S. PATENT DOCUMENTS

| | | | |
|---|---|---|---|
| 2006/0113385 A1 | 6/2006 | Chan et al. | |
| 2006/0208066 A1 | 9/2006 | Finn et al. | |
| 2006/0219776 A1 | 10/2006 | Finn et al. | |
| 2007/0069687 A1 | 3/2007 | Suzuki | |
| 2008/0014867 A1 | 1/2008 | Finn | |
| 2009/0251008 A1* | 10/2009 | Sugaya | G06F 1/263 307/104 |
| 2011/0185098 A1 | 7/2011 | Kim et al. | |
| 2011/0234380 A1* | 9/2011 | Ito | G06K 7/0008 340/10.2 |
| 2013/0264880 A1* | 10/2013 | Kim | H02J 5/005 307/66 |
| 2013/0270343 A1 | 10/2013 | Adams et al. | |
| 2014/0197785 A1* | 7/2014 | Lee | H02J 7/025 320/108 |
| 2015/0137601 A1* | 5/2015 | Fujita | H04B 5/0037 307/31 |
| 2015/0303704 A1* | 10/2015 | Juan | H02J 5/005 320/108 |
| 2016/0099604 A1* | 4/2016 | Von Novak, III | H02J 7/025 320/108 |

FOREIGN PATENT DOCUMENTS

| | | |
|---|---|---|
| CN | 100428263 C | 10/2008 |
| CN | 101517593 A | 8/2009 |
| CN | 101858974 A | 10/2010 |
| CN | 102105845 A | 6/2011 |
| CN | 201936311 U | 8/2011 |
| CN | 102255640 A | 11/2011 |
| CN | 202135126 U | 2/2012 |
| CN | 102436571 A | 5/2012 |
| CN | 202584170 U | 12/2012 |
| CN | 202632303 U | 12/2012 |
| CN | 103218586 A | 7/2013 |

OTHER PUBLICATIONS

Partial English Translation and Abstract of Chinese Patent Application No. CN202135126U, Jan. 4, 2015, 5 pages.
Partial English Translation and Abstract of Chinese Patent Application No. CN103218586A Nov. 4, 2014, 3 pages.
Foreign Communication From a Counterpart Application, PCT Application No. PCT/CN2013/084242, English Translation of International Search Report dated Jan. 2, 2014, 2 pages.
Foreign Communication From a Counterpart Application, PCT Application No. PCT/CN2013/084242, Written Opinion dated Jan. 2, 2014, 4 pages.
Foreign Communication From a Counterpart Application, Chinese Application No. 201310101047.2, Chinese Search Report dated Sep. 28, 2015, 2 pages.
Foreign Communication From a Counterpart Application, Chinese Application No. 201310101047.2, Chinese Office Action dated Oct. 14, 2015, 7 pages.
Foreign Communication From a Counterpart Application, European Application No. 13880642.7, Extended European Search Report dated Jun. 16, 2015, 5 pages.
Partial English Translation and Abstract of Chinese Patent Application No. CN102436571A, May 18, 2015, 10 pages.
Foreign Communication From a Counterpart Application, Chinese Application No. 201310101047.2, Chinese Office Action, dated Apr. 10, 2015, 7 pages.
Foreign Communication From a Counterpart Application, Chinese Application No. 201310101047.2, Chinese Search Report, dated Mar. 27, 2015, 2 pages.

* cited by examiner

WIRELESS CARD READER AND METHOD FOR STORING DATA

CROSS-REFERENCE TO RELATED APPLICATION

This application is a continuation of International Application No. PCT/CN2013/084242, filed on Sep. 26, 2013, which claims priority to Chinese Patent Application No. 201310101047.2, filed on Mar. 26, 2013, both of which are hereby incorporated by reference in their entireties.

TECHNICAL FIELD

The present invention relates to the communications field, and in particular, to a wireless card reader and a method for storing data using the wireless card reader.

BACKGROUND

With the popularity of intelligent terminals (such as smartphones and tablet computers), data often needs to be transmitted between an intelligent terminal and a memory card (which may be installed in the intelligent terminal) or between intelligent terminals.

It is known in the prior art that, an intelligent terminal (hereinafter referred to as a conventional terminal for ease of distinction) reads data from and writes data in a memory card (hereinafter referred to as a conventional memory card for ease of understanding and distinction) using a contact-type interface, for example, a Universal Serial Bus (USB) interface.

To improve a transmission speed and user experience, a technology for implementing wireless transmission between an intelligent terminal and a memory card (or another intelligent terminal) using ultra-wideband impulse radio is proposed. That is, a transmission module for transmitting data using the ultra-wideband impulse radio, a wireless power supply, and a wireless power receiving module are placed in an intelligent terminal (hereinafter referred to as a novel intelligent terminal for ease of understanding and distinction) and a memory card (hereinafter referred to as a new memory card for the convenience of understanding and distinguishing), so as to implement high-speed wireless reading/writing. The new memory card capable of wireless communication is considered as a main development direction of future memory cards because a read/write operation is simple, convenient and fast. However, the novel intelligent terminal cannot use a same wireless manner to read data from or write data in the conventional memory card, which severely affects user experience of the novel intelligent terminal.

SUMMARY

Embodiments of the present invention provide a wireless card reader and a method for storing data, which can improve user experience.

A first aspect provides a wireless card reader, and the wireless card reader includes a wireless power receiving module configured to receive wireless power supply from a first wireless user equipment in a first time period to obtain first power; a wireless communications module, electrically connected to the wireless power receiving module, and configured to use the first power in the first time period and use ultra-wideband impulse radio to perform wireless communication with the first wireless user equipment, so as to transmit a first read/write instruction from the first wireless user equipment and first data that needs to be read or written according to the first read/write instruction; a contact-type power supply module, electrically connected to the wireless power receiving module, and configured to use the first power in the first time period to supply power to an inserted memory card; and a first contact-type communications module, electrically connected to the wireless power receiving module, in communication connection with the wireless communications module, and configured to use the first power in the first time period to perform contact-type communication with the memory card, so as to transmit the first read/write instruction and the first data, so that the first wireless user equipment reads the first data from or writes the first data in the memory card.

With reference to the first aspect, in a first implementation manner of the first aspect, the wireless card reader further includes a contact-type power receiving module configured to receive contact-type power supply from a first contact-type user equipment in a second time period to obtain second power; and a second contact-type communications module, electrically connected to the contact-type power receiving module, in communication connection with the first contact-type communications module, and configured to use the second power in the second time period to perform contact-type communication with the first contact-type user equipment, so as to transmit a second read/write instruction and second data that needs to be read or written according to the second read/write instruction; where the contact-type power supply module is further electrically connected to the contact-type power receiving module, and configured to use the second power in the second time period to supply power to the memory card; and the first contact-type communications module is further electrically connected to the contact-type power receiving module, in communication connection with the second contact-type communications module, and configured to use the second power in the second time period to perform contact-type communication with the memory card, so as to transmit the second read/write instruction and the second data, so that the first contact-type user equipment reads the second data from or writes the second data in the memory card.

With reference to the first aspect and the foregoing implementation manner, in a second implementation manner of the first aspect, the wireless card reader further includes a control module, connected to the wireless power receiving module, the wireless communications module, the contact-type power receiving module, and the second contact-type communications module, and configured to control actions of the wireless power receiving module, the wireless communications module, the contact-type power receiving module, and the second contact-type communications module.

With reference to the first aspect and the foregoing implementation manners, in a third implementation manner of the first aspect, the control module is configured to, if the first power is first detected in the first time period, prohibit the contact-type power receiving module from receiving, in the first time period, a power supply from a second contact-type user equipment, and prohibit the second contact-type communications module from performing contact-type communication with the second contact-type user equipment.

With reference to the first aspect and the foregoing implementation manners, in a fourth implementation manner of the first aspect, the control module is configured to, if the second power is first detected in the second time period, prohibit the wireless power receiving module receiving, in the second time period, a power supply from a second wireless user equipment, and prohibit the wireless communications module from performing contact-type communication with the second wireless user equipment.

With reference to the first aspect and the foregoing implementation manners, in a fifth implementation manner of the first aspect, the control module is configured to, if a third read/write instruction from a user equipment except the first wireless user equipment is received before data transmission corresponding to the first read/write instruction is completed, after data transmission corresponding to the first read/write instruction is completed, perform data transmission according to the third read/write instruction; or pause data transmission corresponding to the first read/write instruction, and continue data transmission corresponding to the third read/write instruction after data transmission corresponding to the first read/write instruction is completed; or cancel data transmission corresponding to the first read/write instruction, and perform data transmission according to the third read/write instruction; or send a first operation indication request to the first wireless user equipment, receive a first operation indication response sent by the first wireless user equipment, and perform data transmission according to the first operation indication response.

With reference to the first aspect and the foregoing implementation manners, in a sixth implementation manner of the first aspect, the control module is configured to, if a fourth read/write instruction from a user equipment except the first contact-type user equipment is received before data transmission corresponding to the second read/write instruction is completed, after data transmission corresponding to the second read/write instruction is completed, perform data transmission according to the fourth read/write instruction; or pause data transmission corresponding to the second read/write instruction, and continue data transmission corresponding to the second read/write instruction after data transmission corresponding to the fourth read/write instruction is completed; or cancel data transmission corresponding to the second read/write instruction, and perform data transmission according to the fourth read/write instruction; or send a second operation indication request to the first contact-type user equipment, receive a second operation indication response sent by the first contact-type user equipment, and perform data transmission according to the second operation indication response.

With reference to the first aspect and the foregoing implementation manners, in a seventh implementation manner of the first aspect, the contact-type power supply module and the first contact-type communications module are connected to the memory card using at least one interface, and the at least one interface includes a secure digital (SD) card interface, a compact flash (CF) card interface, a multimedia card (MMC) interface, a USB interface, a 1394 interface, a subscriber identity module (SIM) card interface, a user identity module (UIM) card interface, and a universal subscriber identity module (USIM) card interface.

With reference to the first aspect and the foregoing implementation manners, in an eighth implementation manner of the first aspect, the contact-type power receiving module and the second contact-type communications module can be connected to a contact-type user equipment using at least one interface, and the at least one interface includes an SD card interface, a CF card interface, an MMC interface, a USB interface, a 1394 interface, a SIM card interface, a UIM card interface, and a USIM card interface.

A second aspect provides a method for storing data, and the method includes receiving wireless power supply from a first wireless user equipment in a first time period to obtain first power; using the first power in the first time period and using ultra-wideband impulse radio to perform wireless communication with the first wireless user equipment, so as to transmit a first read/write instruction from the first wireless user equipment and first data that needs to be read or written according to the first read/write instruction; using the first power in the first time period to supply power to an inserted memory card; and using the first power in the first time period to perform contact-type communication with the memory card, so as to transmit the first read/write instruction and the first data, so that the first wireless user equipment reads the first data from or writes the first data in the memory card.

With reference to the second aspect, in a first implementation manner of the second aspect, the method further includes, if the first power is first detected in the first time period, prohibiting a contact-type power receiving module from receiving, in the first time period, a power supply from a second contact-type user equipment, and prohibiting a second contact-type communications module from performing contact-type communication with the contact-type user equipment.

With reference to the second aspect and the foregoing implementation manner, in a second implementation manner of the second aspect, the performing contact-type communication with the memory card includes, if a third read/write instruction from a user equipment except the first wireless user equipment is received before data transmission corresponding to the first read/write instruction is completed, after data transmission corresponding to the first read/write instruction is completed, performing data transmission according to the third read/write instruction; or pausing data transmission corresponding to the first read/write instruction, and continuing data transmission corresponding to the third read/write instruction after data transmission corresponding to the third read/write instruction is completed; or canceling data transmission corresponding to the first read/write instruction, and performing data transmission according to the third read/write instruction; or sending a first operation indication request to the first wireless user equipment, receiving a first operation indication response sent by the first wireless user equipment, and performing data transmission according to the first operation indication response.

With reference to the second aspect and the foregoing implementation manners, in a third implementation manner of the second aspect, the method further includes receiving contact-type power supply from a first contact-type user equipment in a second time period to obtain second power; using the second power in the second time period to perform contact-type communication with the first contact-type user equipment, so as to transmit a second read/write instruction and second data that needs to be read or written according to the second read/write instruction; using the second power in the second time period to supply power to the memory card; and using the second power in the second time period to perform contact-type communication with the memory card, so as to transmit the second read/write instruction and the second data, so that the first contact-type user equipment reads the second data from or writes the second data in the memory card.

With reference to the second aspect and the foregoing implementation manners, in a fourth implementation manner of the second aspect, the method further includes, if the second power is first detected in the second time period, prohibiting a wireless power receiving module from receiving, in the second time period, a power supply from a second wireless user equipment, and prohibiting a wireless communications module from performing contact-type communication with the second wireless user equipment.

With reference to the second aspect and the foregoing implementation manners, in a fifth implementation manner of the second aspect, the performing contact-type communication with the first contact-type user equipment includes, if a fourth read/write instruction from a user equipment except the first contact-type user equipment is received before data transmission corresponding to the second read/write instruction is completed, after data transmission corresponding to the second read/write instruction is completed, performing data transmission according to the fourth read/write instruction; or pausing data transmission corresponding to the second read/write instruction, and continuing data transmission corresponding to the second read/write instruction after data transmission corresponding to the fourth read/write instruction is completed; or canceling data transmission corresponding to the second read/write instruction, and performing data transmission according to the fourth read/write instruction; or sending a second operation indication request to the first contact-type user equipment, receiving a second operation indication response sent by the first contact-type user equipment, and performing data transmission according to the second operation indication response.

According to a wireless card reader and a method for storing data in the embodiments of the present invention, because a wireless expansion card has a wireless communications module and a first contact-type communications module, contact-type communication with a conventional memory card is performed using a contact-type communications module, communication with a novel intelligent terminal using ultra-wideband impulse radio to read or write data is performed using the wireless communications module, and data and signaling are converted between different protocols between the wireless communications module and the contact-type communications module, which can implement that the new intelligent terminal reads data from or writes data in the conventional memory card, thereby expanding a use scope of the novel intelligent terminal or the conventional memory card, enhancing the promotion and popularity of an ultra-wideband impulse radio transmission technology, and improving user experience of a conventional intelligent terminal.

BRIEF DESCRIPTION OF DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
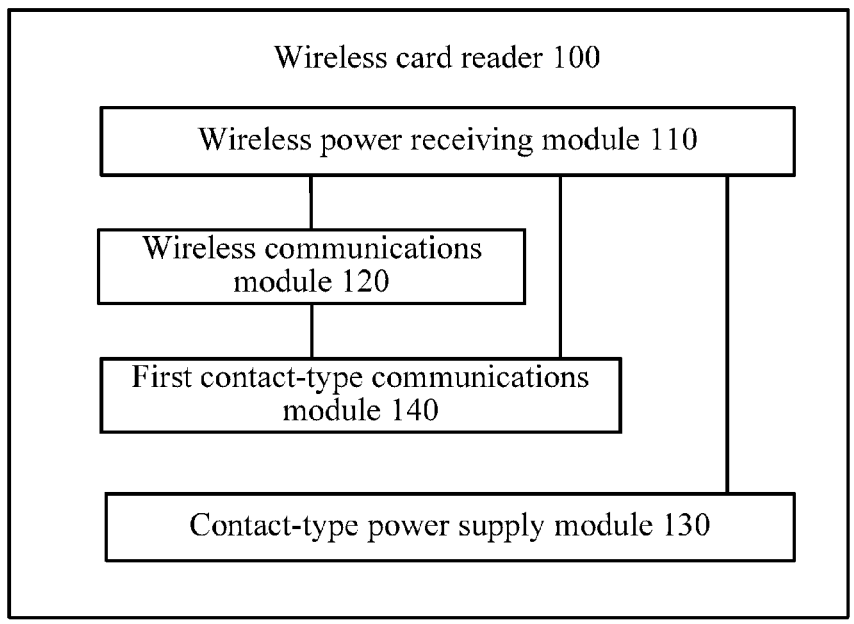
FIG. 1 is a schematic block diagram of a wireless card reader according to an embodiment of the present invention.

FIG. 1 is a schematic block diagram of a wireless card reader 100 according to an embodiment of the present invention. As shown in FIG. 1, the wireless card reader 100 includes a wireless power receiving module 110 configured to receive wireless power supply from a first wireless user equipment in a first time period to obtain first power; a wireless communications module 120, electrically connected to the wireless power receiving module, and configured to use the first power in the first time period and use ultra-wideband impulse radio to perform wireless communication with the first wireless user equipment, so as to transmit a first read/write instruction from the first wireless user equipment and first data that needs to be read or written according to the first read/write instruction; a contact-type power supply module 130, electrically connected to the wireless power receiving module, and configured to use the first power in the first time period to supply power to an inserted memory card; and a first contact-type communications module 140, electrically connected to the wireless power receiving module, in communication connection with the wireless communications module, and configured to use the first power in the first time period to perform contact-type communication with the memory card, so as to transmit the first read/write instruction and the first data, so that the first wireless user equipment reads the first data from or writes the first data in the memory card.

In the following, functions of the modules in this embodiment of the present invention are described first.

In this embodiment of the present invention, a wireless power supply technology may be adopted in the wireless power receiving module 110 to receive wireless power supply from a user equipment (for example, the first wireless user equipment). According to the wireless power supply technology, a non-radiative wireless energy transfer manner may be used to supply power (or in other words, perform driving), that is, a non-radioactive field may be used to gather energy borne by electromagnetic waves in the space (for example, most electromagnetic waves distributed in the air during transmission of radio broadcasting). Energy (or in other words, vibration) is transferred between the wireless power receiving module 110 and the user equipment using same natural frequencies. In this embodiment of the present invention, the wireless power receiving module 110 may further implement wireless power receiving using various manners, such as electric field coupling, magnetic field coupling, photoelectric coupling, and electromagnetic resonance.

It should be noted that, as long as the wireless power receiving can be implemented, the shape and size of the wireless power receiving module 110 in this embodiment of the present invention may be arbitrarily configured as required, and the present invention imposes no specific limitation.

In this embodiment of the present invention, the wireless communications module 120 is electrically connected to the wireless power receiving module 110, and can use an ultra-wideband (UWB) impulse radio communications technology to transmit data after the wireless communications module 120 receives power supply from the wireless power receiving module 110. UWB wireless communication is a method that performs communication using impulses at very short time intervals (less than 1 nanosecond (ns)) and is carrier-free. The UWB wireless communications is also referred to as impulse radio, and time domain or carrier-free communications. Compared with a common binary phase shift keying signal waveform, the UWB wireless communications does not use a cosine wave to perform carrier modulation, but sends a lot of impulses at time intervals less than 1 ns, so that this type of communication manner occupies a very large bandwidth, and because spectral power density is very low, it has features of common spread spectrum communications. The UWB wireless communications uses non-sinusoidal narrow impulses ranging from nanoseconds to picoseconds to transmit data. By transmitting a signal of extremely low power on a wider spectrum, the UWB can achieve a data transmission rate of hundreds of Megabits per second (Mbit/s) to Gigabits per second (Gbit/s) within a range of about 10 meters. UWB has many advantages such as high anti-interference performance, a high transmission rate, an extremely wide bandwidth, low electric energy consumption, and low transmit power.

It should be noted that, as long as the UWB wireless communications can be implemented, the shape and size of the wireless communications module 120 in this embodiment of the present invention may be arbitrarily configured as required, and the present invention imposes no specific limitation.

The contact-type power supply module 130 is electrically connected to the wireless power receiving module 110, and is electrically connected to the user equipment using a contact-type physical interface, so that after power supply of the wireless power receiving module 110 is received, the contact-type power supply module 130 may supply power to the inserted memory card using the contact-type physical interface. In this embodiment of the present invention, a method and a process of supplying power using the contact-type physical interface may be similar to the prior art, and to avoid repetition herein, descriptions of the method and the process are omitted.

It should be noted that, as long as receiving contact-type power supply from the user equipment and supplying power to another module in the wireless expansion card can be implemented, the shape and size of the contact-type power supply module 130 in this embodiment of the present invention may be arbitrarily configured as required, and the present invention imposes no specific limitation.

Similarly, the first contact-type communications module 140 may be in communication connection with the inserted memory card using a contact-type physical interface, so that information may be transmitted between the first contact-type communications module 140 and the memory card. In this embodiment of the present invention, a method and a process of transmitting the information using the contact-type physical interface may be similar to the prior art, and to avoid repetition herein, descriptions of the method and the process are omitted.

In addition, in this embodiment of the present invention, the first contact-type communications module 140 is in communication connection with the wireless communications module 120, so as to implement conversion between a contact-type communication information form (for example, an encoding and decoding manner, and a bearing manner) and a wireless communication (specifically, wireless communication using the ultra-wideband impulse radio) information form, which is described in detail in the following.

It should be noted that, as long as contact-type communication with the user equipment and the conversion between forms can be implemented, the shape and size of the first contact-type communications module 140 in this embodiment of the present invention may be arbitrarily configured as required, and the present invention imposes no specific limitation.

Optionally, in this embodiment of the present invention, the contact-type power supply module and the first contact-type communications module can be connected to the memory card using at least one interface, and the at least one interface includes an SD card interface, a CF card interface, an MMC interface, a USB interface, a 1394 interface, a SIM card interface, a UIM card interface, and a USIM card interface.

Further, in this embodiment of the present invention, the contact-type power supply module 130 can be electrically connected to the memory card using various physical interfaces (hereinafter referred to as contact-type power supply interfaces), such as, a UIM card interface, a USIM card interface, an SD memory card interface, a CF card interface, an MMC interface, a SIM card interface, a USB interface, and obtain power from the user equipment.

Similarly, after being powered on (specifically, receiving the power supply from the wireless power receiving module 110), the first contact-type communications module 140 can be in communication connection with the user equipment using one or more interfaces among the foregoing interfaces (hereinafter referred to as a contact-type communication interface), so as to transmit data and signaling to the user equipment.

A method and a process of a user equipment A (an example of the first wireless user equipment), which cannot store (in other words, read or write) data in a conventional memory card using contact-type communication, reading data from or writing data in the conventional memory card (hereinafter referred to as a memory card B) are described in the following.

In this embodiment of the present invention, when the user equipment A needs to read data from or write data in the memory card B (an example of the first time period), the user equipment A may supply power to the wireless expansion card 100 (specifically, the contact-type power receiving module 110), supply power to the wireless card reader 100 (in which the memory card B is inserted) in this embodiment of the present invention using contact-type communication, and transmit a read/write instruction a (an example of the first read/write instruction).

For example, when reading data from the memory card B, the user equipment A may transmit a data read instruction a to the wireless expansion card 100.

Therefore, after receiving the power, the wireless power receiving module 110 may supply power to the wireless communications module 120, the contact-type power supply module 130, and the first contact-type communications module 140 (an example of the first power); after being powered on, the wireless power receiving module 120 is started and receives the data read instruction a; also may decapsulate (in other words, decode) the data read instruction a according to the UWB wireless communications protocol, and send the decapsulated data read instruction a to the first contact-type communications module 140. Herein, a process of decapsulating the read/write instruction and a process of encapsulating the data may be similar to the prior art, and to avoid repetition herein, descriptions of the processes are omitted.

Because the first contact-type communications module 140 is in communication connection with the wireless communications module 120, the wireless communications module 120 may send the decapsulated data read instruction a to the first contact-type communications module 140.

After being powered on, the first contact-type communications module 140 may receive the decapsulated data read instruction a, secondarily encapsulate (in other words, encode) the data read instruction a according to a communications protocol corresponding to the contact-type communication interface, and subsequently, may send the data read instruction a encapsulated secondarily to the memory card B using the contact-type communication interface. Herein, a process of encapsulating the read/write instruction and a process of encapsulating data may be similar to the prior art, and to avoid repetition herein, descriptions of the processes are omitted.

After being powered on, the contact-type power supply module 130 may supply power to the memory card B using the contact-type power supply interface, and therefore, after being powered on, the memory card B may receive the data read instruction a using the contact-type communication interface, search a storage medium of the memory card B for data b corresponding to the data read instruction a, encapsulate (in other words, encode) the data b according to an interface protocol corresponding to the contact-type communication interface, and send the encapsulated data b to the wireless card reader 100 (specifically, the first contact-type communications module 140) using the contact-type communication interface.

After receiving the data b, the first contact-type communications module 140 decapsulates (in other words, decodes) the data b according to the interface protocol corresponding to the contact-type communication interface, and sends the decapsulated data b to the wireless communications module 120. Herein, a process of decapsulating signaling and a process of decapsulating data may be similar to the prior art, and to avoid repetition herein, descriptions of the processes are omitted.

After receiving the data b, the wireless communications module 120 secondarily encapsulates (in other words, encodes) the data b according to the UWB wireless communications protocol, and sends the data b that is encapsulated secondarily to the user equipment A. Herein, a process of encapsulating signaling and a process of encapsulating data may be similar to the prior art, and to avoid repetition herein, descriptions of the processes are omitted.

Therefore, the user equipment A can obtain data b that needs to be read.

For another example, when writing data in the memory card B, the user equipment A may transmit a data write instruction c and data d to the wireless expansion card 100.

Therefore, after receiving the power supply, the wireless power receiving module 110 may supply power to the wireless communications module 120, the contact-type power supply module 130, and the first contact-type communications module 140 (an example of the first power); after being powered on, the wireless power receiving module 120 is started and receives the data write instruction c and the data d; also may decapsulate (in other words, decode) the data write instruction c and the data d according to the UWB wireless communications protocol, and send the decapsulated data write instruction c and the data d to the first contact-type communications module 140. Herein, a process of decapsulating the read/write instruction and a process of encapsulating the data may be similar to the prior art, and to avoid repetition herein, descriptions of the processes are omitted.

Because the first contact-type communications module 140 is in communication connection with the wireless communications module 120, the wireless communications module 120 may send the decapsulated data write instruction c and the data d to the first contact-type communications module 140.

After being powered on, the first contact-type communications module 140 may receive the decapsulated data write instruction c and the data d, secondarily encapsulate (in other words, encode) the data write instruction c and the data d according to the communications protocol corresponding to the contact-type communication interface, and subsequently, send the data write instruction c and the data d that are encapsulated secondarily to the memory card B using the contact-type communication interface. Herein, a process of encapsulating the read/write instruction and a process of encapsulating the data may be similar to the prior art, and to avoid repetition herein, descriptions of the processes are omitted.

After being powered on, the contact-type power supply module 130 may supply power to the memory card B using the contact-type power supply interface, and therefore, after being powered on, the memory card B may receive the data write instruction c and the data d using the contact-type communication interface, and store the data d in a storage medium of the memory card B.

Therefore, the user equipment A can store the data d in the memory card B.

According to a wireless card reader in this embodiment of the present invention, because the wireless expansion card has a wireless communications module and a first contact-type communications module, contact-type communication with a conventional memory card is performed using a contact-type communications module, communication with a novel intelligent terminal using ultra-wideband impulse radio to read or write data is performed using the wireless communications module, and data and signaling are converted between different protocols between the wireless communications module and the contact-type communications module, which can implement that the novel intelligent terminal reads data from or writes data in the conventional memory card, thereby expanding a use scope of the novel intelligent terminal or the conventional memory card, enhancing the promotion and popularity of an ultra-wideband impulse radio transmission technology, and improving user experience of a conventional intelligent terminal.

Optionally, the wireless card reader further includes a contact-type power receiving module 150 configured to receive contact-type power supply from a first contact-type user equipment in a second time period to obtain second power; and a second contact-type communications module 160, electrically connected to the contact-type power receiving module 150, in communication connection with the first contact-type communications module, and configured to use the second power in the second time period to perform contact-type communication with the first contact-type user equipment, so as to transmit a second read/write instruction and second data that needs to be read or written according to the second read/write instruction; where the contact-type power supply module 130 is further electrically connected to the contact-type power receiving module 150, and configured to use the second power in the second time period to supply power to the memory card; and the first contact-type communications module 140 is further electrically connected to the contact-type power receiving module 150, in communication connection with the second contact-type communications module, and configured to use the second power in the second time period to perform contact-type communication with the memory card, so as to transmit the second read/write instruction and the second data, so that the first contact-type user equipment reads the second data from or writes the second data in the memory card.

Further, in this embodiment of the present invention, the contact-type power receiving module 150 may be electrically connected to the user equipment (for example, the first contact-type user equipment) using the contact-type interface, so as to receive the contact-type power supply from the user equipment, and obtain power. In this embodiment of the present invention, a method and a process of obtaining power using the contact-type interface may be similar to the prior art, and to avoid repetition herein, descriptions of the method and the process are omitted.

It should be noted that, as long as receiving the contact-type power supply from the user equipment and supplying power to another module in the wireless expansion card can be implemented, the shape and size of the contact-type power receiving module 150 in this embodiment of the present invention may be arbitrarily configured as required, and the present invention imposes no specific limitation.

Similarly, the second contact-type communications module 160 may be in communication connection with the user equipment (for example, the first contact-type user equipment) using the contact-type interface, so that information may be transmitted between the second contact-type communications module 160 and the user equipment. In this embodiment of the present invention, a method and a process of transmitting the information using the contact-type interface may be similar to the prior art, and to avoid repetition herein, descriptions of the method and the process are omitted.

It should be noted that, as long as contact-type communication with the user equipment and the conversion between forms can be implemented, the shape and size of the second contact-type communications module 160 in this embodiment of the present invention may be arbitrarily configured as required, and the present invention imposes no specific limitation.

Optionally, the contact-type power receiving module and the second contact-type communications module can be connected to a contact-type user equipment using at least one interface, and the at least one interface includes an SD card interface, a CF card interface, an MMC interface, a USB interface, a 1394 interface, a SIM card interface, a UIM card interface, and a USIM card interface.

Further, in this embodiment of the present invention, the contact-type power receiving module 150 may be electrically connected to the memory card using various physical interfaces (hereinafter referred to as a contact-type power supply interface), such as a UIM card interface, a USIM card interface, an SD interface, a CF card interface, an MMC interface, a SIM card interface, a USB interface, and obtain power from the user equipment.

Similarly, after being powered on (specifically, receiving power supply from the contact-type power receiving module 150), the first contact-type communications module 140 can be in communication connection with the user equipment using one or more interfaces among the foregoing interfaces (hereinafter referred to as a contact-type communication interface), so as to transmit data and signaling to the user equipment.

Herein, it should be noted that, a physical interface used by the contact-type power receiving module and the second contact-type communications module generally may be different from a physical interface used by the contact-type power supply module and first contact-type communications module, so as to implement that the conventional intelligent terminal reads data from and writes data in a memory card that is not supported by the conventional intelligent terminal. However, the present invention is not limited thereto. The physical interface used by the contact-type power receiving module and the second contact-type communications module may also be the same as the physical interface used by the contact-type power supply module and first contact-type communications module.

In addition, in this embodiment of the present invention, the wireless card reader 100 may provide interfaces for various memory cards, and the physical interface can be set according to the type of the memory card. That is, there may be various interfaces for the memory cards in this embodiment of the present invention. Similarly, in this embodiment of the present invention, the wireless card reader 100 may provide interfaces for various contact-type user equipments, and the physical interface can be set according to the type of the contact-type user equipment. That is, there may be various interfaces for the contact-type user equipments in this embodiment of the present invention.

In this embodiment of the present invention, a method and a process of the conventional intelligent terminal (the first contact-type user equipment) reading data from and writing data in the memory card using the wireless card reader 100 in this embodiment of the present invention may be similar to the prior art, and to avoid repetition herein, descriptions of the method and the process are omitted.

It should be noted that, in this embodiment of the present invention, the wireless user equipment refers to a user equipment (that is, the novel intelligent terminal) capable of performing the UWB wireless communication, and the contact-type user equipment refers to a user equipment (that is, the conventional intelligent terminal) capable of performing contact-type communication. In addition, the wireless user equipment may also have a contact-type communication function, and similarly, the contact-type user equipment may also have a function of performing the UWB wireless communication. The present invention imposes no specific limitation.

In addition, in this embodiment of the present invention, the wireless communications module 120 is further connected to the contact-type power receiving module 150 (in other words, the contact-type power receiving module 150 can supply power to the wireless communications module 120).

The wireless communications module 120 is electrically connected to two modules, namely the contact-type power receiving module 150 and the wireless power receiving module 110, so that, for example, when the wireless communications module 120 receives power supply from the user equipment A (an example of the first wireless user equipment) using the wireless power receiving module 110, to perform data transmission for the user equipment A, the wireless communications module 120 can receive power supply from a user equipment C (for example, the second contact-type user equipment) using the contact-type power receiving module 150. In this case, the wireless communications module 120 may use power supplied by the user equipment A or power supplied by the user equipment C to perform data transmission; similarly, the contact-type power supply module 130 may use the power supplied by the user equipment A or the power supplied by the user equipment C to supply power to the memory card; and the first contact-type communications module 140 may use the power supplied by the user equipment A or the power supplied by the user equipment C to perform data transmission to the memory card.

Therefore, for the wireless communications module 120, the contact-type power supply module 130, and the first contact-type communications module 140, the contact-type power receiving module 150 and the wireless power receiving module 110 may work in an active/standby mode, that is, the wireless communications module 120, the contact-type power supply module 130, and the first contact-type communications module 140 may use any one of the contact-type power receiving module 150 and the wireless power receiving module 110 as an active power supply module and use the other one as a standby power supply module, so as to further ensure data transmission and improve reliability of the wireless card reader of the present invention.

In a method for selecting the active power supply module, for example, when data transmission for the user equipment A is being performed, and in a case in which the power supply from the user equipment C is obtained in a transmission process, in this case, the wireless power receiving module 110 that obtains the power from the user equipment A may be used as the active power supply module. Because the transmitted data is for the user equipment A, before data transmission is completed, a possibility of actively removing the power supply by the user equipment A is small. Therefore, data transmission can be ensured.

In this embodiment of the present invention, the wireless card reader 100 may have a power supply rectifying function. For example, when data transmission for the user equipment A is performed, there is a case in which the power supply from the user equipment C is obtained in a reading/writing process; if the power supply from the C reaches a preset threshold, for example, a voltage of a USB interface (for example, about 5.0 volts (V)), the wireless card reader 100 may determine that the power supply from the contact-type power receiving module 150 is stable, therefore may perform data transmission using the power supply from the contact-type power receiving module 150.

In this way, because the contact-type power supply that is more stable can be used to replace the wireless power supply that is relatively unstable, the reliability of the wireless card reader of the present invention can be further improved.

It should be understood that, the specific value listed above as the preset threshold and the type of the value are only for exemplary description, but the present invention is not limited thereto. Any value that can indicate that the wireless card reader can obtain stable power supply and a type of the value both fall within the protection scope of the present invention. For example, the preset threshold may be any value ranging from 4.75 V to 5.25 V, or, the preset threshold may also be a fluctuation range value (for example, 4.75 V to 5.25 V) of a voltage within a specified time, that is, if the voltage within a preset time fluctuates in a preset range, it may be determined that the voltage is stable.

In addition, in this case, the wireless power receiving module 110 may further be disabled, that is, the wireless power receiving module 110 does not receive the power supply from the user equipment A, so as to reduce a burden on the wireless power receiving module 110, and prolong the service life of the wireless power receiving module 110.

Figure 2:
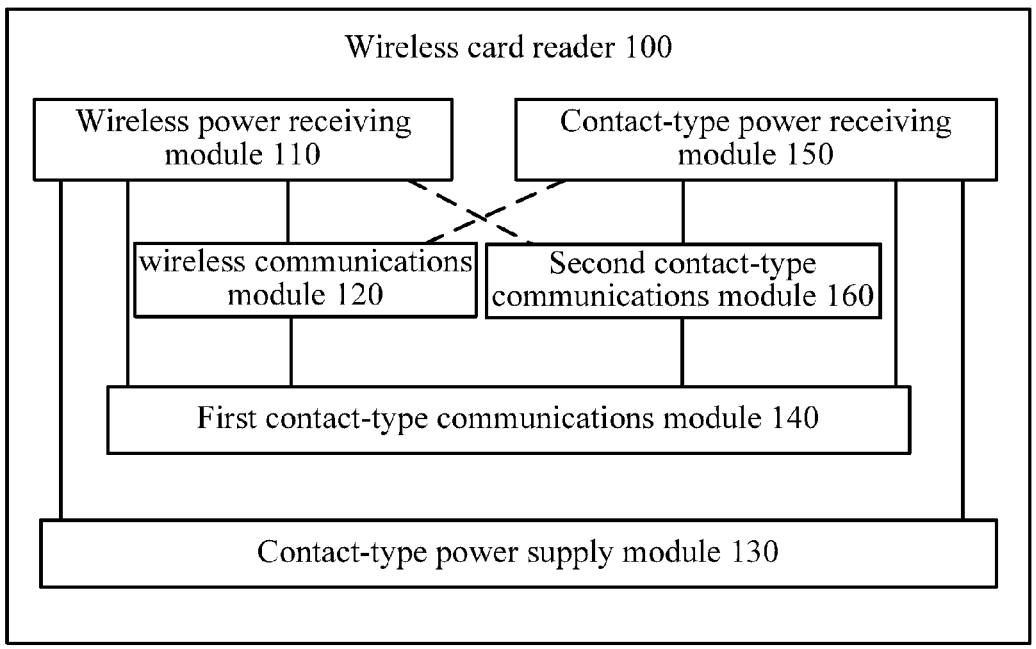
FIG. 2 is a schematic block diagram of a wireless card reader according to another embodiment of the present invention.

In addition, a dash line in FIG. 2 indicates that the wireless power receiving module 110 may be electrically connected to the second contact-type communications module 160, and may also not be electrically connected to the second contact-type communications module 160; similarly, the contact-type power receiving module 150 may be electrically connected to the wireless communications module 120, and may also not be electrically connected to the wireless communications module 120. The present invention imposes no specific limitation.

Optionally, the wireless card reader further includes a control module, connected to the wireless power receiving module, the wireless communications module, the contact-type power supply module, the first contact-type communications module, the contact-type power receiving module, and the second contact-type communications module, and configured to control actions of the wireless power receiving module, the wireless communications module, the contact-type power supply module, the first contact-type communications module, the contact-type power receiving module, and the second contact-type communications module.

Because there are two communications modules in this embodiment of the present invention, which are the wireless communications module 120 and the second contact-type communications module 160, there may be a case in which data or signaling of another user equipment is received when data transmission is performed on the inserted memory card for a user equipment. Therefore, in this embodiment of the present invention, a control module with a logical switching function may further be configured.

A logical switching process is described in detail in the following.

Optionally, the control module is configured to, if the first power is first detected in the first time period, prohibit the contact-type power receiving module from receiving, in the first time period, the power supply from a second contact-type user equipment, and prohibit the second contact-type communications module from performing contact-type communication with the second contact-type user equipment.

In addition, the control module is configured to, if the second power is first detected in the second time period, prohibit the wireless power receiving module from receiving, in the second time period, the power supply from a second wireless user equipment, and prohibit the wireless communications module from performing contact-type communication with the second wireless user equipment.

In this embodiment of the present invention, the control module may implement the logical switching by controlling enabling and disabling of the wireless power receiving module 110, the contact-type power receiving module 150, the wireless communications module 120, and the second contact-type communications module 160, that is, data transmission only for one user equipment is performed at one moment.

For example, if the power supply from the wireless power receiving module 110 is first detected, it may be determined that the user equipment A (an example of the first wireless user equipment) needs to read or write data; therefore, the contact-type power receiving module 150 and the second contact-type communications module 160 may be disabled (in other words, actions of the contact-type power receiving module 120 and the second contact-type communications module 160 are prohibited). Therefore, data transmission for a user equipment G (an example of the second contact-type user equipment) is not performed in the process of reading/writing data performed for the user equipment A, so as to avoid a reading/writing error of the memory card caused by data transmission simultaneously performed for a plurality of user equipments, and further improve the reliability of the card reader 100 of the present invention.

Similarly, if the power supply from the contact-type power receiving module 150 is first detected, it may be determined that the user equipment C (an example of the first contact-type user equipment) needs to read or write data; therefore, the wireless power receiving module 110 and the wireless communications module 120 may be disabled (in other words, actions of the wireless power receiving module 110 and the wireless communications module 120 are prohibited). Therefore, data transmission for a user equipment H (an example of the second wireless user equipment) is not performed in the process of reading/writing data performed for the user equipment C (in the second time period), so as to avoid a reading/writing error of the memory card caused by data transmission simultaneously performed for a plurality of user equipments, and further improve the reliability of the card reader 100 of the present invention.

Optionally, the control module is configured to, if a third read/write instruction from a user equipment except the first wireless user equipment is received before reading/writing data corresponding to the first read/write instruction is completed, after reading/writing data corresponding to the first read/write instruction is completed, perform reading/writing data according to the third read/write instruction; or pause reading/writing data corresponding to the first read/write instruction, and continue reading/writing data corresponding to the first read/write instruction after reading/writing data corresponding to the third read/write instruction is completed; or cancel reading/writing data corresponding to the first read/write instruction, and perform reading/writing data according to the third read/write instruction; or send a first operation indication request to the first wireless user equipment, receive a first operation indication response sent by the first wireless user equipment, and perform reading/writing data according to the first operation indication response.

In addition, the control module is configured to, if a fourth read/write instruction from a user equipment except the first contact-type user equipment is received before reading/writing data corresponding to the second read/write instruction is completed, after reading/writing data corresponding to the second read/write instruction is completed, perform reading/writing data according to the fourth read/write instruction; or pause reading/writing data corresponding to the second read/write instruction, and continue reading/writing data corresponding to the second read/write instruction after reading/writing data corresponding to the fourth read/write instruction is completed; or cancel reading/writing data corresponding to the second read/write instruction, and perform reading/writing data according to the fourth read/write instruction; or send a second operation indication request to the first contact-type user equipment, receive a second operation indication response sent by the first contact-type user equipment, and perform reading/writing data according to the second operation indication response.

In this embodiment of the present invention, if the wireless card reader 100 reads data from or writes data in the memory card according to a read/write instruction X of a user equipment E (a wireless user equipment or a contact-type user equipment), a read/write instruction Y of a user equipment F (a wireless user equipment or a contact-type user equipment) is received.

For example, the control module may continue to perform data transmission for the user equipment E, and after data transmission for the user equipment E is completed, perform data transmission according to the read/write instruction Y. For example, it may be detected whether power supply from the user equipment F can be received, and if not detected, data transmission does not need to be performed according to the read/write instruction Y. For another example, query information may further be sent to the user equipment F (using the wireless communications module 120 or the contact-type communications module 140), so as to notify the user equipment F that data transmission can be performed, and an operation is performed according to a response of the user equipment F. For example, if a response is obtained, data transmission is performed according to the read/write instruction Y or a read/write instruction Z resent by the user equipment F, and if no response is obtained within a specified time, the power supply may be cut off, and data transmission may be canceled.

Alternatively, the control module may pause data transmission for the user equipment E, immediately perform data transmission according to the read/write instruction Y. After completing data transmission, the control module may continue to perform data transmission for the user equipment E. For example, it may be detected whether power supply from the user equipment E can be received, and if not detected, data transmission does not need to be performed according to the read/write instruction Y. For another example, query information may further be sent to the user equipment E (using the wireless communications module 120 or the contact-type communications module 140), so as to notify the user equipment E that data transmission can be performed, and an operation is performed according to a response of the user equipment E. For example, if a response is obtained, data transmission is performed according to the read/write instruction X or a read/write instruction W resent by the user equipment E. If no response is obtained within a specified time, the power supply may be cut off, and data transmission may be canceled.

Alternatively, the control module may cancel data transmission for the user equipment E, and immediately perform data transmission according to the read/write instruction Y.

Alternatively, the control module may send a query message (an operation indication request) to the user equipment E. For example, the user equipment E may be queried about whether current data transmission (an example of the operation indication request) may be paused. If a response of the user equipment E is obtained, for example, the user equipment E (specifically, a user of the user equipment E) agrees to pause data transmission (an example of the operation indication response), the control module may perform data transmission according to the read/write instruction Y, and after data transmission according to the read/write instruction Y is completed, continue data transmission for the user equipment E.

It should be understood that, the user equipment E may be a wireless user equipment (for example, the first wireless user equipment), and may also be a contact-type user equipment (for example, the first contact-type user equipment).

It should be understood that, the listed operation indication request, operation indication response, and corresponding operations are only for exemplary description, and the present invention is not limited thereto.

In this way, a reading/writing error caused by simultaneously performing reading/writing data on a plurality of user equipments can be avoided using the method and process of logic switching, which further improves the reliability of the wireless card reader 100 of the present invention. In addition, operations can be performed according to an instruction from a user through the interaction with a user equipment that is reading or writing data. This improves human-centered performance of the wireless card reader 100 of the present invention, and further improves user experience.

It should be understood that, the method and process of logic switching that are listed above are only for exemplary description, but the present invention is not limited thereto. For example, further the interaction may be performed with the user equipment that sends a read/write instruction last.

It should be understood that, in this embodiment of the present invention, the power supply time may be inconsistent with time for data reading or writing for a same user equipment, that is, the memory card performs reading/writing data only for one user equipment in one time period; but another user equipment may supply power to the memory card in this time period. In addition, the time period for performing reading/writing data, which are listed above and include the first time period and the second time period, may be continuous or may also be discontinuous, and the present invention imposes no specific limitation, for example, when the logic switching is performed, a time period when reading/writing data is paused includes time for reading/writing data before the pause and time for reading/writing data after the pause, and the pause may occur multiple times; the present invention imposes no specific limitation.

It should be understood that, for ease of understanding and distinction, the second contact-type user equipment and the first contact-type user equipment are distinguished; but, for example, when the first time period and the second time period overlap, the first contact-type user equipment and the first contact-type user equipment may also be a same user equipment; similarly, the first wireless user equipment and the second wireless user equipment may also be a same user equipment.

In addition, it should be noted that, the power supply rectification function of the card reader 100 is also executed by the control module.

Figure 3:
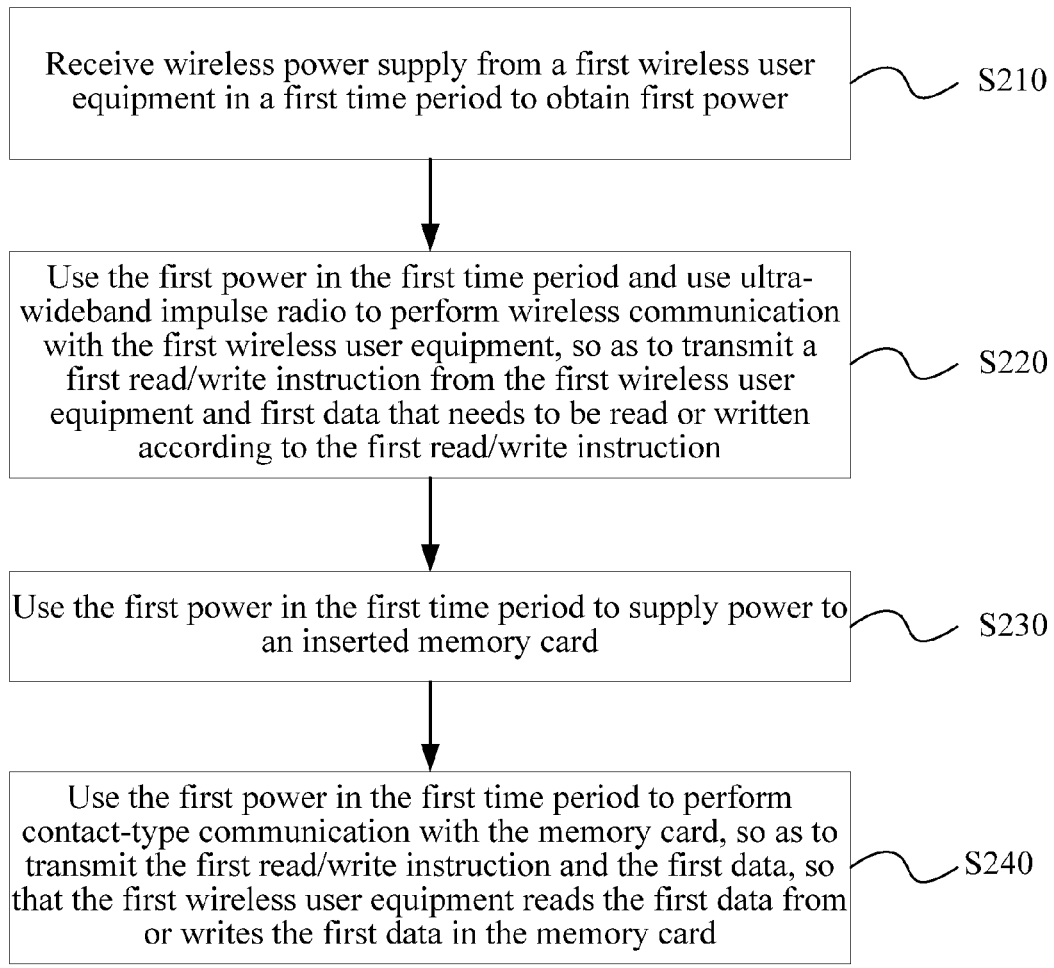
FIG. 3 shows a schematic process of a method for storing data according to an embodiment of the present invention.

The function and structure of the wireless card reader in this embodiment of the present invention are described above in detail with reference to FIG. 1 and FIG. 2, and a method for storing data in this embodiment of the present invention is described below in detail with reference to FIG. 3. FIG. 3 shows a schematic process of a method 200 for storing data according to an embodiment of the present invention. As shown in FIG. 3, the method 200 includes:

S210: Receive wireless power supply from a first wireless user equipment in a first time period to obtain first power.

S220: Use the first power in the first time period and use ultra-wideband impulse radio to perform wireless communication with the first wireless user equipment, so as to transmit a first read/write instruction from the first wireless user equipment and first data that needs to be read or written according to the first read/write instruction.

S230: Use the first power in the first time period to supply power to an inserted memory card.

S240: Use the first power in the first time period to perform contact-type communication with the memory card, so as to transmit the first read/write instruction and the first data, so that the first wireless user equipment reads the first data from or writes the first data in the memory card.

Optionally, the method further includes, if the first power is first detected in the first time period, prohibiting a contact-type power receiving module from receiving, in the first time period, power supply from a second contact-type user equipment, and prohibiting a second contact-type communications module from performing contact-type communication with the contact-type user equipment.

Optionally, the performing contact-type communication with the memory card includes, if a third read/write instruction from a user equipment except the first wireless user equipment is received before data transmission corresponding to the first read/write instruction is completed, after data transmission corresponding to the first read/write instruction is completed, performing data transmission according to the third read/write instruction; or pausing data transmission corresponding to the first read/write instruction, and continuing data transmission corresponding to the third read/write instruction after data transmission corresponding to the third read/write instruction is completed; or canceling data transmission corresponding to the first read/write instruction, and performing data transmission according to the third read/write instruction; or sending a first operation indication request to the first wireless user equipment, receiving a first operation indication response sent by the first wireless user equipment, and performing data transmission according to the first operation indication response.

Optionally, the method further includes receiving contact-type power supply from a first contact-type user equipment in a second time period to obtain second power; using the second power in the second time period to perform contact-type communication with the first contact-type user equipment, so as to transmit a second read/write instruction and second data that needs to be read or written according to the second read/write instruction; using the second power in the second time period to supply power to the memory card; and using the second power in the second time period to perform contact-type communication with the memory card, so as to transmit the second read/write instruction and the second data, so that the first contact-type user equipment reads the second data from or writes the second data in the memory card.

Optionally, the method further includes, if the second power is first detected in the second time period, prohibiting a wireless power receiving module from receiving, in the second time period, power supply from a second wireless user equipment, and prohibiting a wireless communications module from performing contact-type communication with the second wireless user equipment.

Optionally, the performing contact-type communication with the first contact-type user equipment includes, if a fourth read/write instruction from a user equipment except the first contact-type user equipment is received before data transmission corresponding to the second read/write instruction is completed, after data transmission corresponding to the second read/write instruction is completed, performing data transmission according to the fourth read/write instruction; or pausing data transmission corresponding to the second read/write instruction, and continuing data transmission corresponding to the second read/write instruction after data transmission corresponding to the fourth read/write instruction is completed; or canceling data transmission corresponding to the second read/write instruction, and performing data transmission according to the fourth read/write instruction; or sending a second operation indication request to the first contact-type user equipment, receiving a second operation indication response sent by the first contact-type user equipment, and performing data transmission according to the second operation indication response.

An entity for implementing the method 200 for storing data according to this embodiment of the present invention may correspond to a wireless card reader in the method of this embodiment of the present invention, and units, that is, modules, and the foregoing other operations and/or functions, in the method 200 for storing data are separately implemented by corresponding modules that implement the wireless card reader 100 in FIG. 1, which are, for brevity, not described herein again.

According to a method for storing data in this embodiment of the present invention, because a wireless expansion card has a wireless communications module and a first contact-type communications module, contact-type communication with a conventional memory card is performed using a contact-type communications module, communication with a novel intelligent terminal using ultra-wideband impulse radio to read or write data is performed using the wireless communications module, and data and signaling are converted between different protocols between the wireless communications module and the contact-type communications module, which can implement that the novel intelligent terminal reads data from or writes data in the conventional memory card, thereby expanding a use scope of the new intelligent terminal or the conventional memory card, enhancing the spread and popularity of an ultra-wideband impulse radio transmission technology, and improving user experience of a conventional intelligent terminal.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. The described apparatus embodiment is merely exemplary. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each unit may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless card reader comprising:
    a wireless power receiver configured to receive wireless power supply from a first wireless user equipment in a first time period to obtain first power;
    a wireless communications module electrically connected to the wireless power receiver and configured to use the first power in the first time period and use ultra-wideband impulse radio to perform wireless communication with the first wireless user equipment, so as to transmit a first read or write instruction from the first wireless user equipment and first data that needs to be read or written according to the first read or write instruction;
    a contact-type power supply electrically connected to the wireless power receiver and configured to use the first power in the first time period to supply power to an inserted memory card; and
    a first contact-type communications module electrically connected to the wireless power receiver, in communication connection with the wireless communications module, and configured to use the first power in the first time period to perform contact-type communication with the memory card, so as to transmit the first read or write instruction and the first data, such that the first wireless user equipment reads the first data from or writes the first data in the memory card.

2. The wireless card reader according to claim 1, further comprising a controller connected to the wireless power receiver and the wireless communications module, wherein the controller is configured to control actions of the wireless power receiver and the wireless communications module.

3. The wireless card reader according to claim 2, wherein when a second read or write instruction from a user equipment except the first wireless user equipment is received before data transmission corresponding to the first read or write instruction is completed, the controller is configured to perform data transmission according to the second read or write instruction after data transmission corresponding to the first read or write instruction is completed.

4. The wireless card reader according to claim 2, wherein when a second read or write instruction from a user equipment except the first wireless user equipment is received before data transmission corresponding to the first read or write instruction is completed, the controller is configured to pause data transmission corresponding to the first read or write instruction, and continue data transmission corresponding to the first read or write instruction after data transmission corresponding to the second read or write instruction is completed.

5. The wireless card reader according to claim 2, wherein when a second read or write instruction from a user equipment except the first wireless user equipment is received before data transmission corresponding to the first read or write instruction is completed, the controller is configured to cancel data transmission corresponding to the first read or write instruction, and perform data transmission according to the second read or write instruction.

6. The wireless card reader according to claim 2, wherein when a second read or write instruction from a user equipment except the first wireless user equipment is received before data transmission corresponding to the first read or write instruction is completed, the controller is configured to:
  send a first operation indication request to the first wireless user equipment;
  receive a first operation indication response sent by the first wireless user equipment; and
  perform data transmission according to the first operation indication response.

7. The wireless card reader according to claim 1, wherein the contact-type power supply and the first contact-type communications module can be connected to the memory card using at least one interface, and wherein the at least one interface comprises one or more of: a secure digital (SD) card interface, a compact flash (CF) card interface, a multimedia card (MMC) interface, a Universal Serial Bus (USB) interface, a 1394 interface, a subscriber identity module (SIM) card interface, a user identity module (UIM) card interface, and a universal subscriber identity module (USIM) card interface.

8. A method for storing data, comprising:
  receiving wireless power supply from a first wireless user equipment in a first time period, to obtain first power;
  performing wireless communication with the first wireless user equipment using the first power in the first time period and using ultra-wideband impulse radio, so as to transmit a first read or write instruction from the first wireless user equipment and first data that needs to be read or written according to the first read or write instruction;
  supplying power to an inserted memory card using the first power in the first time period; and
  performing contact-type communication with the memory card using the first power in the first time period, so as to transmit the first read or write instruction and the first data, so that the first wireless user equipment reads the first data from or writes the first data in the memory card.

9. The method according to claim 8, wherein when a second read or write instruction from a user equipment except the first wireless user equipment is received before data transmission corresponding to the first read or write instruction is completed, performing the contact-type communication with the memory card comprises:
  performing data transmission according to the second read or write instruction after data transmission corresponding to the first read or write instruction is completed;
  pausing data transmission corresponding to the first read or write instruction, and continuing data transmission corresponding to the first read or write instruction after data transmission corresponding to the second read or write instruction is completed;
  canceling data transmission corresponding to the first read or write instruction, and performing data transmission according to the second read or write instruction; or
  sending a first operation indication request to the first wireless user equipment, receiving a first operation indication response sent by the first wireless user equipment, and performing data transmission according to the first operation indication response.

10. The method according to claim 8, further comprising:
  receiving contact-type power supply from a first contact-type user equipment in a second time period, to obtain second power;
  performing contact-type communication with the first contact-type user equipment using the second power in the second time period, so as to transmit a third read or write instruction and second data that needs to be read or written according to the third read or write instruction;
  supplying power to the memory card using the second power in the second time period; and
  performing contact-type communication with the memory card using the second power in the second time period, so as to transmit the third read or write instruction and the second data, so that the first contact-type user equipment reads the second data from or writes the second data in the memory card.

11. The method according to claim 10, further comprising:
  prohibiting a wireless power receiver from receiving, in the second time period, power supply from a second wireless user equipment when the second power is first detected in the second time period; and
  prohibiting a wireless communications module to perform contact-type communication with the second wireless user equipment.

12. The method according to claim 10, wherein when a fourth read or write instruction from a user equipment except the first contact-type user equipment is received before data transmission corresponding to the third read or write instruction is completed, performing the contact-type communication with the first contact-type user equipment comprises:
  performing data transmission according to the fourth read or write instruction after data transmission corresponding to the third read or write instruction is completed;
  pausing data transmission corresponding to the third read or write instruction, and continuing data transmission corresponding to the third read or write instruction after data transmission corresponding to the fourth read or write instruction is completed;
  canceling data transmission corresponding to the third read or write instruction, and performing data transmission according to the fourth read or write instruction; or sending a second operation indication request to the first contact-type user equipment, receiving a second operation indication response sent by the first contact-type user equipment, and performing data transmission according to the second operation indication response.

13. A method according to claim 8, wherein a wireless power receiver of a wireless card reader is configured to receive the wireless power supply from the first wireless user equipment in the first time period in order to obtain the first power,
wherein a wireless communications module of the wireless card reader is electrically connected to the wireless power receiver and configured to perform wireless communication with the first wireless user equipment using the first power in the first time period and using ultra-wideband impulse radio, so as to transmit the first read or write instruction from the first wireless user equipment and first data that needs to be read or written according to the first read or write instruction,
wherein a contact-type power supply module of the wireless card reader is electrically connected to the wireless power receiving module and configured to supply power to the inserted memory card using the first power in the first time period,
wherein the inserted memory card is inserted into the wireless expansion card, and
wherein a first contact-type communications module of the wireless card reader is electrically connected to the wireless power receiver, in communication connection with the wireless communications module, is configured to perform contact-type communication with the inserted memory card using the first power in the first time period, so as to transmit the first read or write instruction and the first data, so that the first wireless user equipment reads the first data from or writes the first data in the inserted memory card.

* * * * *